US012008976B2

(12) United States Patent
Zhang et al.

(10) Patent No.: US 12,008,976 B2
(45) Date of Patent: Jun. 11, 2024

(54) DISPLAY PANEL AND DRIVING METHOD, AND DISPLAY DEVICE

(71) Applicant: Xiamen Tianma Micro-Electronics Co.,Ltd., Xiamen (CN)

(72) Inventors: Peng Zhang, Shanghai (CN); Xinzhao Liu, Shanghai (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 17/881,121

(22) Filed: Aug. 4, 2022

(65) Prior Publication Data

US 2022/0375424 A1 Nov. 24, 2022

Related U.S. Application Data

(63) Continuation of application No. 16/863,843, filed on Apr. 30, 2020, now Pat. No. 11,468,861.

(30) Foreign Application Priority Data

Dec. 27, 2019 (CN) ......................... 201911380359.5

(51) Int. Cl.
*G09G 3/36* (2006.01)

(52) U.S. Cl.
CPC ......... *G09G 3/3692* (2013.01); *G09G 3/3659* (2013.01)

(58) Field of Classification Search
CPC .. G09G 3/3688; G09G 3/3692; G09G 3/3674; G09G 3/3659
See application file for complete search history.

(56) References Cited

U.S. PATENT DOCUMENTS 7,505,017 B1 * 3/2009 Yeo ...................... G09G 3/3688 345/87
2001/0050665 A1 * 12/2001 Yeo ...................... G09G 3/3688 345/87
2004/0239603 A1 * 12/2004 Toriumi ............... G09G 3/3688 345/89

(Continued)

FOREIGN PATENT DOCUMENTS

CN 109524446 A 3/2019

*Primary Examiner* — Nelson M Rosario
*Assistant Examiner* — Scott D Au
(74) *Attorney, Agent, or Firm* — Anova Law Group, PLLC

(57) ABSTRACT

A display panel and driving method, and a display device are provided. The display panel includes a display region and a border region. The display region includes a plurality of data lines extending along a first direction. The border region includes a data output circuit, having an output end electrically connected to a data line. The data output circuit includes at least one demultiplexer and 2L first-demultiplexers, where L is a positive integer, and L≥1. Each demultiplexer group includes a plurality of second-demultiplexers. The plurality of second-demultiplexers share a group of clock signal buses, wherein a portion of the plurality of second-demultiplexers are connected with a portion of the group of clock signal buses, and a remaining portion of the plurality of second-demultiplexers are connected with a remaining portion of the group of clock signal buses.

22 Claims, 11 Drawing Sheets

(56) References Cited

U.S. PATENT DOCUMENTS

| | | | | |
|---|---|---|---|---|
| 2005/0078074 | A1* | 4/2005 | Morita | G09G 3/3614 345/96 |
| 2009/0289878 | A1* | 11/2009 | Chen | G09G 3/3688 345/87 |
| 2010/0156776 | A1* | 6/2010 | Jeoung | G09G 3/3688 345/98 |
| 2015/0154902 | A1 | 6/2015 | Lee et al. | |
| 2016/0232837 | A1* | 8/2016 | Lee | G09G 3/3275 |
| 2017/0337876 | A1 | 11/2017 | Kim et al. | |
| 2017/0337877 | A1 | 11/2017 | Kim et al. | |
| 2018/0018920 | A1 | 1/2018 | Kim et al. | |
| 2019/0088221 | A1* | 3/2019 | Takahashi | G09G 3/3688 |
| 2020/0160793 | A1* | 5/2020 | Cherng | G09G 3/3688 |

* cited by examiner

DISPLAY PANEL AND DRIVING METHOD, AND DISPLAY DEVICE

CROSS-REFERENCES TO RELATED APPLICATIONS

This application is a continuation application of U.S. patent application Ser. No. 16/863,843, filed on Apr. 30, 2020, which claims the priority of Chinese patent application No. 201911380359.5, filed on Dec. 27, 2019, the entirety of which is incorporated herein by reference.

FIELD

The present disclosure generally relates to the field of display technology and, more particularly, relates to a display panel and driving method, and a display device.

BACKGROUND

A display panel includes a display region and a border region disposed around the display region. The display region includes a plurality of sub-pixels and various signal lines, e.g., a data line, and a gate line, etc. The border region is configured to provide peripheral circuits connected to the various signal lines, e.g., a gate driving circuit connected to each gate line, a demultiplexer connected to a data line, etc.

FIG. 1 illustrates a schematic diagram of a display panel. To reduce a border width of the display panel, referring to FIG. 1, a demultiplexer 01 is often connected to a plurality of data lines data', and each data line data' in the display region A' is extended to a border region B' and connected to the demultiplexer 01 in the border region B'. Considering the overall layout design of the panel, the demultiplexers 01 desires to be respectively disposed on both sides of a symmetry axis Y of the display panel along an extension direction of the data line.

If a quantity of the demultiplexers 01 in the border region B' of the display panel is an even number, quantities of the demultiplexers 01 on both sides of the symmetry axis Y are the same. If the quantity of the demultiplexers 01 in the border region B' of the display panel is an odd number, quantities of the demultiplexers 01 on both sides of the symmetry axis Y are different, which causes an asymmetric distribution of the data lines data' in the border region B', and causes abnormal display problems, e.g., display split, etc. The disclosed display panel and driving method, and display device are directed to solve one or more problems set forth above and other problems.

SUMMARY

One aspect of the present disclosure provides a display panel. The display panel includes a display region and a border region. The display region includes a plurality of pixels and a plurality of data lines extending along a first direction. The border region includes a data output circuit, and an output end of the data output circuit is electrically connected to a data line of the plurality of data lines. The data output circuit includes at least one demultiplexer group and 2L first-demultiplexers, where L is a positive integer, and L$\geqslant$1. One demultiplexer group of the at least one demultiplexer group is electrically connected to M data lines, and one first-demultiplexer of the 2L first-demultiplexers is electrically connected to N data lines, where M=N$\geqslant$2, and M and N are positive integers, respectively. Each demultiplexer group of the at least one demultiplexer group includes a plurality of second-demultiplexers, and each second-demultiplexer of the plurality of second-demultiplexers is electrically connected to P data lines, where N>P$\geqslant$1, and P is a positive integer. The plurality of second-demultiplexers share a group of clock signal buses, wherein a portion of the plurality of second-demultiplexers are connected with a portion of the group of clock signal buses, and a remaining portion of the plurality of second-demultiplexers are connected with a remaining portion of the group of clock signal buses.

Another aspect of the present disclosure provides a driving method of a display panel. The display panel includes a display region and a border region. The display region includes a plurality of pixels and a plurality of data lines extending along a first direction. The border region includes a data output circuit, and an output end of the data output circuit is electrically connected to a data line of the plurality of data lines. The data output circuit includes at least one demultiplexer group and 2L first-demultiplexers, where L is a positive integer, and L$\geqslant$1. One demultiplexer group of the at least one demultiplexer group is electrically connected to M data lines, and one first-demultiplexer of the 2L first-demultiplexers is electrically connected to N data lines, where M=N$\geqslant$2, and M and N are positive integers, respectively. Each demultiplexer group of the at least one demultiplexer group includes a plurality of second-demultiplexers, and each second-demultiplexer of the plurality of second-demultiplexers is electrically connected to P data lines, where N>P$\geqslant$1, and P is a positive integer. The plurality of second-demultiplexers share a group of clock signal buses, wherein a portion of the plurality of second-demultiplexers are connected with a portion of the group of clock signal buses, and a remaining portion of the plurality of second-demultiplexers are connected with a remaining portion of the group of clock signal buses. The driving method includes receiving image data of a to-be-displayed frame, and according to the image data of the to-be-displayed frame, simultaneously outputting, by a driving chip, a signal to each demultiplexer. A signal outputted by the driving chip to each first-demultiplexer of the 2L first-demultiplexers is a grayscale signal obtained according to the image data of the to-be-displayed frame. A signal outputted by the driving chip to a second-demultiplexer of the plurality of second-demultiplexers of a demultiplexer group of the at least one demultiplexer group is one of a high-impedance signal and the grayscale signal obtained according to the image data of the to-be-displayed frame. When a signal outputted by the driving chip to the second-demultiplexer of the demultiplexer group is the grayscale signal, a signal outputted by the driving chip to any other second-demultiplexer of the demultiplexer group is the high-impedance signal.

Another aspect of the present disclosure provides a display device. The display device includes a display panel. The display panel includes a display region and a border region. The display region includes a plurality of pixels and a plurality of data lines extending along a first direction. The border region includes a data output circuit, and an output end of the data output circuit is electrically connected to a data line of the plurality of data lines. The data output circuit includes at least one demultiplexer group and 2L first-demultiplexers, where L is a positive integer, and L$\geqslant$1. One demultiplexer group of the at least one demultiplexer group is electrically connected to M data lines, and one first-demultiplexer of the 2L first-demultiplexers is electrically connected to N data lines, where M=N$\geqslant$2, and M and N are positive integers, respectively. Each demultiplexer group of the at least one demultiplexer group includes a plurality of second-demultiplexers, and each second-demultiplexer of the plurality of second-demultiplexers is electrically connected to P data lines, where N>P≥1, and P is a positive integer. The plurality of second-demultiplexers share a group of clock signal buses, wherein a portion of the plurality of second-demultiplexers are connected with a portion of the group of clock signal buses, and a remaining portion of the plurality of second-demultiplexers are connected with a remaining portion of the group of clock signal buses.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION OF THE DISCLOSURE

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

Similar reference numbers and letters represent similar terms in the following Figures, such that once an item is defined in one Figure, it does not need to be further discussed in subsequent Figures.

Figure 1:
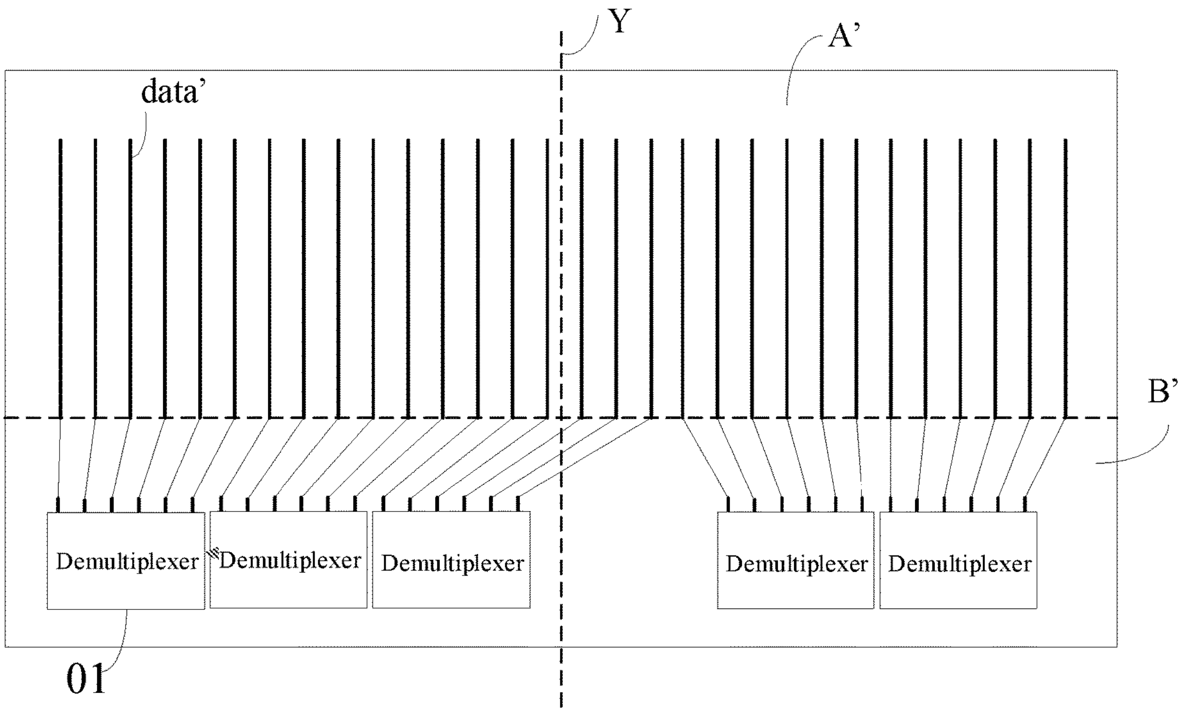
FIG. 1 illustrates a schematic diagram of a display panel.
Figure 2:
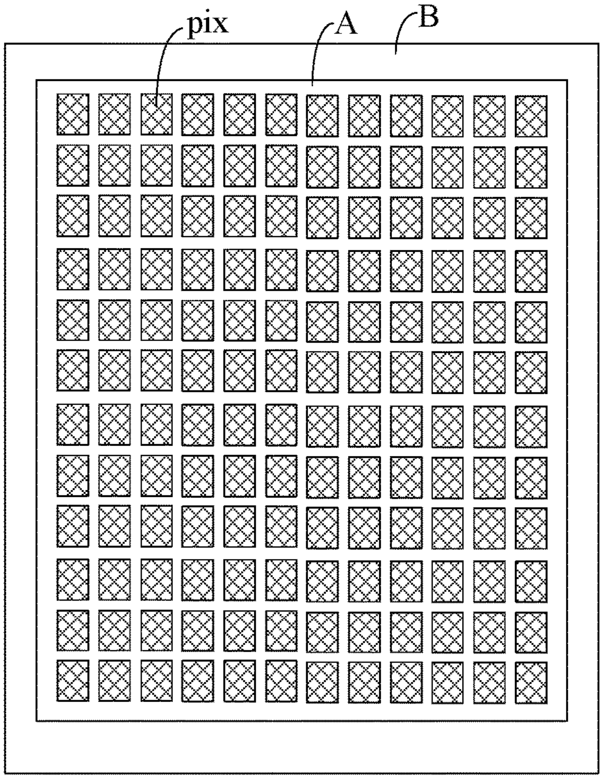
FIG. 2 illustrates a schematic diagram of an exemplary display panel consistent with disclosed embodiments of the present disclosure.
Figure 3:
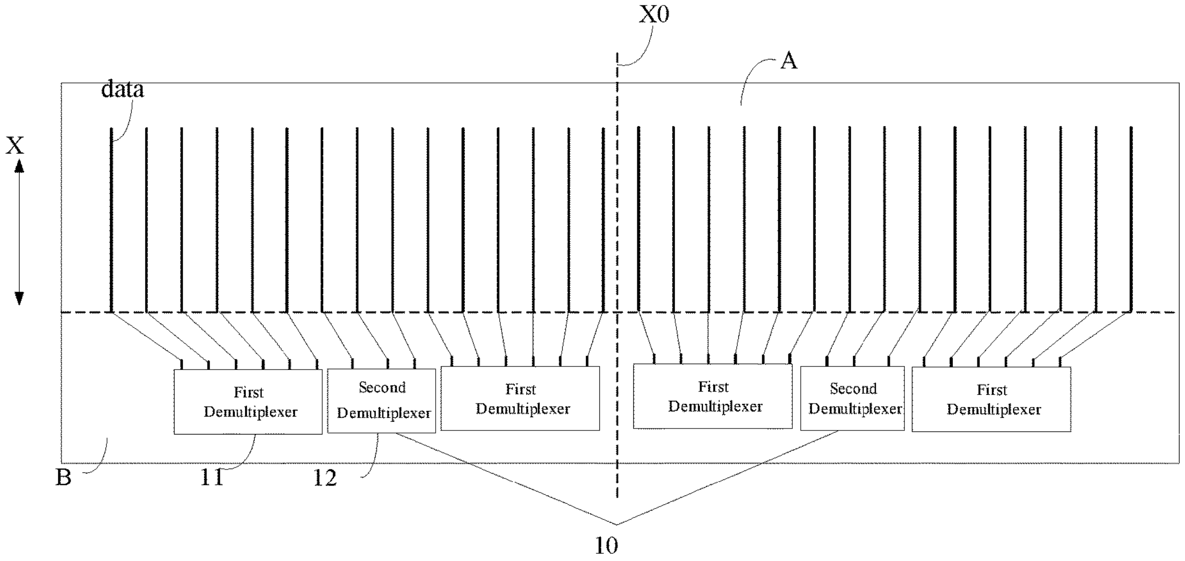
FIG. 3 illustrates a schematic diagram of another exemplary display panel consistent with disclosed embodiments of the present disclosure.
Figure 4:
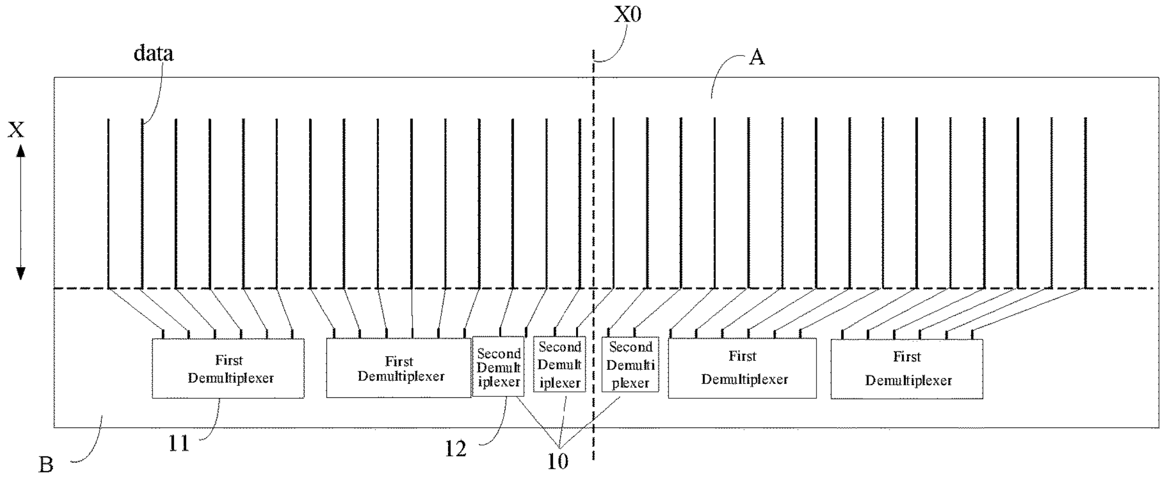
FIG. 4 illustrates a schematic diagram of another exemplary display panel consistent with disclosed embodiments of the present disclosure.

The present disclosure provides a display panel. FIG. 2 illustrates a schematic diagram of a display panel consistent with disclosed embodiments of the present disclosure; FIG. 3 illustrates a schematic diagram of another display panel consistent with disclosed embodiments of the present disclosure; and FIG. 4 illustrates a schematic diagram of another display panel consistent with disclosed embodiments of the present disclosure. Referring to FIGS. 2-4, the display panel may include a display region A and a border region B. The display region A may include a plurality of pixels 'pix' and a plurality of data lines 'data' extending along a first direction X. The border region B may include a data output circuit, and an output end of the data output circuit may be electrically connected to a data line 'data'.

The data output circuit may include at least one demultiplexer group 10 and 2L first-demultiplexers 11, where L is a positive integer and L≥1. One demultiplexer group 10 may be electrically connected to M data lines 'data', and one first-demultiplexer 11 may be electrically connected to N data lines 'data', where M=N≥2, and M and N are positive integers, respectively. Each demultiplexer group 10 may include a plurality of second-demultiplexers 12, and each second-demultiplexer 12 may be electrically connected to P data lines 'data', where N>P≥1, and P is a positive integer.

In the disclosed display panel, in one embodiment, when a ratio of a total quantity of data lines in the display region over the value N is an odd number, referring to FIG. 3 and FIG. 4, the data output circuit connected to the data lines 'data' may include at least one demultiplexer group 10 and 2L first-demultiplexers 11. Because the quantity of the first-demultiplexers 11 in the border region B is an even number, it may be ensured that quantities of the first-demultiplexers 11 on both sides of a first symmetry axis X0 of the display panel extending along the first direction X may be the same, thereby ensuring that the data lines 'data' connected to the first-demultiplexers 11 may be symmetrically distributed in the border region B.

Referring to FIG. 3, when the quantity of the demultiplexer groups 10 is an odd number (FIG. 3 illustrates one demultiplexer group as an example), if each demultiplexer group 10 includes an even number of second-demultiplexers 12, it may be ensured that quantities of the second-demultiplexers 12 on both sides of the first symmetry axis X0 may be the same. Because the quantity of data lines 'data' connected to a different second-demultiplexer 12 is the same, the data lines 'data' connected to the second-demultiplexers 12 may be ensured to be symmetrically distributed in the border region B.

Referring to FIG. 4, when each demultiplexer group 10 includes an odd number of second-demultiplexers 12 (FIG. 4 illustrates three second-demultiplexers as an example), because the quantity of the data lines 'data' connected to one demultiplexer group 10 is the same as the quantity of data lines 'data' connected to one first-demultiplexer 11, while each demultiplexer group 10 includes a plurality of second-demultiplexers 12, the quantity of the data lines 'data' connected to each second-demultiplexer 12 may be at most half of the quantity of data lines 'data' connected to one first-demultiplexer 11. When the quantities of second-demultiplexers 12 on both sides of the first symmetry axis X0 differ by one, because the quantity of data lines connected to the second-demultiplexer 12 is substantially small, the difference in quantities of the data lines 'data' on both sides of the first symmetry axis X0 may be ensured to be substantially small, thereby reducing the distribution asymmetry of the data lines 'data' connected to the second-demultiplexer 12 in the border region B.

Therefore, in the above-disclosed display panel, because the data output circuit includes at least one demultiplexer group and an even number of first-demultiplexers, the even number of first-demultiplexers may ensure data lines connected to the first-demultiplexers to be symmetrically distributed in the border region. The quantity of data lines connected to one demultiplexer group may be the same as the quantity of data lines connected to one first-demultiplexer, and each demultiplexer group may include a plurality of second-demultiplexers. Therefore, the quantity of data lines connected to each second-demultiplexer may be at most half of the quantity of data lines connected to the first-demultiplexer. It may be ensured that the data lines connected to the second-demultiplexer to be symmetrically distributed in the border region or may reduce the distribution asymmetry of the data lines connected to the second-demultiplexer in the border region. Therefore, the abnormal display caused by the asymmetry distribution of the data lines in the border region may be solved or improved.

In one embodiment, the data output circuit may be configured to provide signals outputted by a driving chip to the data lines in the display region. Further, in the disclosed display panel, one pixel may often include a plurality of sub-pixels, and each one sub-pixel may be connected to one data line.

In the disclosed display panel, in one embodiment, referring to FIG. 3, the display region A may include the first symmetry axis X0, and the first symmetry axis X0 may be extended along the first direction X. The entire demultiplexers, i.e., the even number of first-demultiplexers 11 and the plurality of second-demultiplexers 12, may be symmetrically distributed with the first symmetry axis X0 as a symmetry axis. Therefore, entire data lines 'data' connected to the data output circuit may be symmetrically distributed in the border region.

In the disclosed display panel, in one embodiment, referring to FIG. 3, M may be an even number, in other words, one demultiplexer group 10 may be connected to an even number of data lines. The display panel may include one demultiplexer group 10, and the demultiplexer group 10 may include two second-demultiplexers 12. In other words, the data output circuit may include 2L first-demultiplexers 11 and two second-demultiplexers 12. Therefore, the first-demultiplexers 11 and the second-demultiplexers 12 may be ensured to be symmetrically distributed on both sides of the first symmetry axis X0, thereby ensuring the data lines 'data' connected to the first and second-demultiplexers to be symmetrically distributed in the border region. Further, the quantity of the first and second-demultiplexers in the border region B may be ensured to be minimal, which may mean that the first and second-demultiplexers may occupy a substantially small area of the border region, and may facilitate the narrow-border design.

In the disclosed display panel, in one embodiment, referring to FIG. 3, as long as the 2L first-demultiplexers 11 are ensured to be symmetrically distributed on both sides of the first symmetry axis X0, and the two second-demultiplexers 12 are ensured to be symmetrically distributed on both sides of the first symmetry axis X0, the position of the second-demultiplexer 12 may be arbitrarily set, which is not limited herein.

Figure 5:
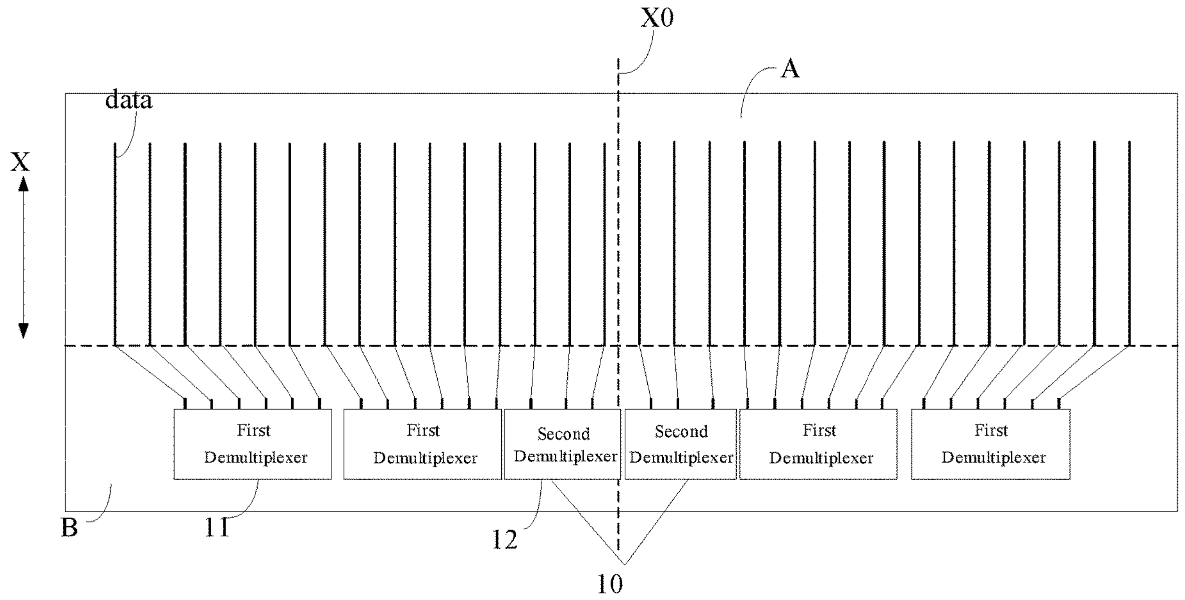
FIG. 5 illustrates a schematic diagram of another exemplary display panel consistent with disclosed embodiments of the present disclosure.

FIG. 5 illustrates a schematic diagram of another display panel consistent with disclosed embodiments of the present disclosure. In the disclosed display panel, in one embodiment, referring to FIG. 5, the two second-demultiplexers 12 may be disposed adjacent to each other, and L first-demultiplexers 11 may be disposed on each side of the demultiplexer group 10. The two second-demultiplexers 12 may be disposed adjacent to each other, which may ensure that there is only one side of each second-demultiplexer 12 on which the first-demultiplexers 11 are disposed. In view of this, when the second-demultiplexer 12 and the first-demultiplexer 11 have different display effect due to different structures thereof, the full screen may merely have two display difference boundaries, such that the display effect may be improved.

When adjacent second-demultiplexers 12 (or adjacent first-demultiplexer 11) have a same structure, the display effect may be the same. Compared with a case where the second-demultiplexers 12 and the first-demultiplexers 11 are alternately disposed, the case where the second-demultiplexer 12 are adjacently disposed and the first-demultiplexer is merely disposed on one side of a second-demultiplexer 12 may improve the display effect. In some embodiments, the second-demultiplexer 12 and the first-demultiplexer 11 may merely have different quantities of output terminals, which may not cause difference in display effect.

Figure 6:
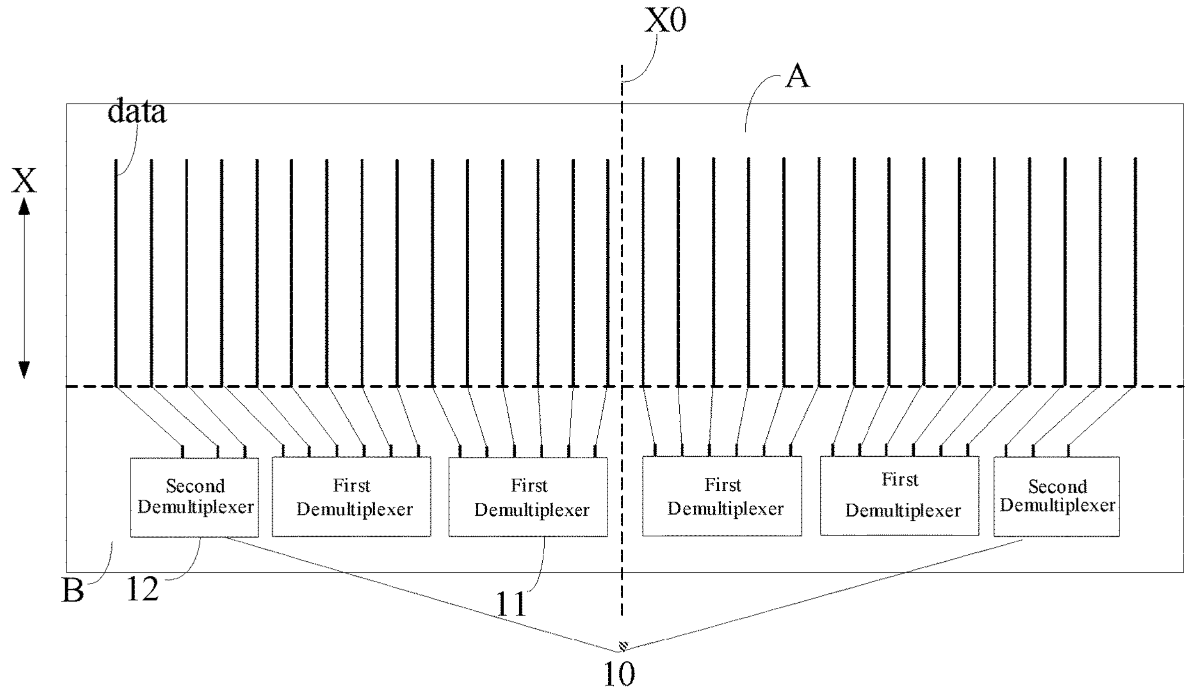
FIG. 6 illustrates a schematic diagram of another exemplary display panel consistent with disclosed embodiments of the present disclosure.

FIG. 6 illustrates a schematic diagram of another display panel consistent with disclosed embodiments of the present disclosure. In the disclosed display panel, in one embodiment, referring to FIG. 6, the 2L first-demultiplexers 11 may be sequentially disposed adjacent to each other and between the two second-demultiplexers 12. In other words, the data lines 'data' connected to the second-demultiplexers 12 may be located in the display panel near the left border region and the right border region in FIG. 6. In view of this, when the second-demultiplexer 12 and the first-demultiplexer 11 have different display effect due to different structures thereof, because the data lines 'data' connected to the second-demultiplexers 12 are close to the border region, the display difference near the border region of the display panel may not be easily recognized by eyes, such that the display effect may be ensured.

Figure 7:
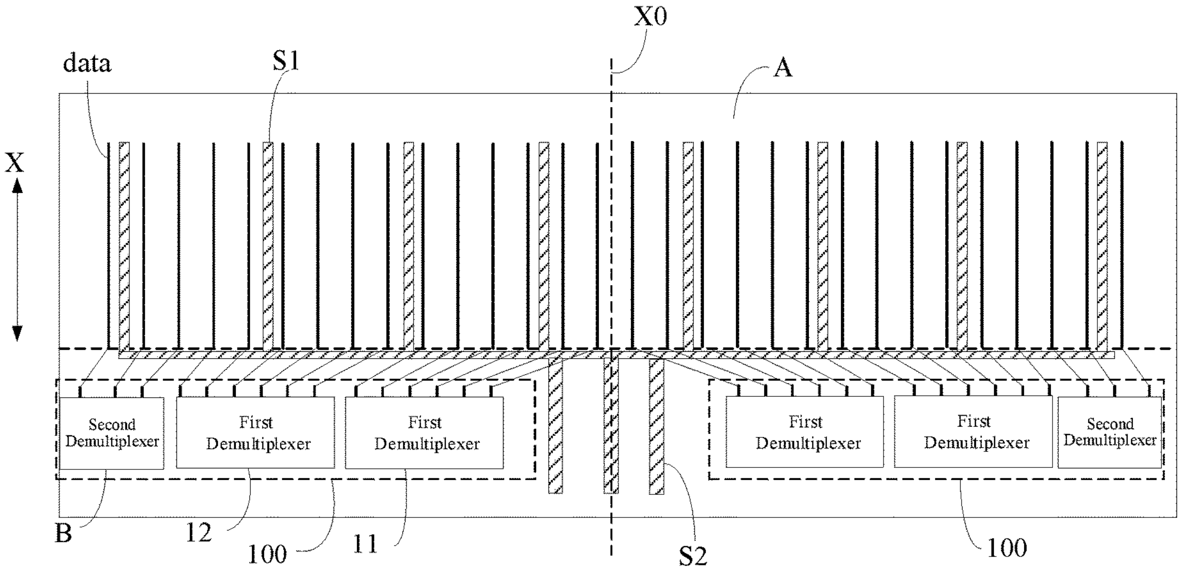
FIG. 7 illustrates a schematic diagram of another exemplary display panel consistent with disclosed embodiments of the present disclosure.

FIG. 7 illustrates a schematic diagram of another display panel consistent with disclosed embodiments of the present disclosure. In the disclosed display panel, in one embodiment, referring to FIG. 7, the L first-demultiplexers 11 that are sequentially disposed adjacent to each other and one second-demultiplexer 12 may form a circuit group 100. The border region B may be disposed with two circuit groups 100, and there may be a gap between the two circuit groups 100.

The display region A may be further disposed with a plurality of signal lines S1. A first wiring S2 extending along the first direction X may be disposed in the gap, and the first wiring S2 may be electrically connected to the signal line S1. The signal lines S1 in the display region A may be connected to the first wiring S2 disposed in the gap between the two circuit groups 100, which may facilitate a driving chip to subsequently provide a signal to the signal line S1 in the display region A through the first wiring S2.

In one embodiment, the signal line may be determined according to the nature of the display panel. For example, when the display panel is an organic light-emitting diode (OLED) display panel, the signal line may include a fixed power supply voltage line, a reference signal line, etc., which is not limited herein. The signal lines having a same voltage may often be connected to a same first wiring, which may reduce a quantity of wirings in the border region, and may facilitate the narrow-border design.

Figure 8:
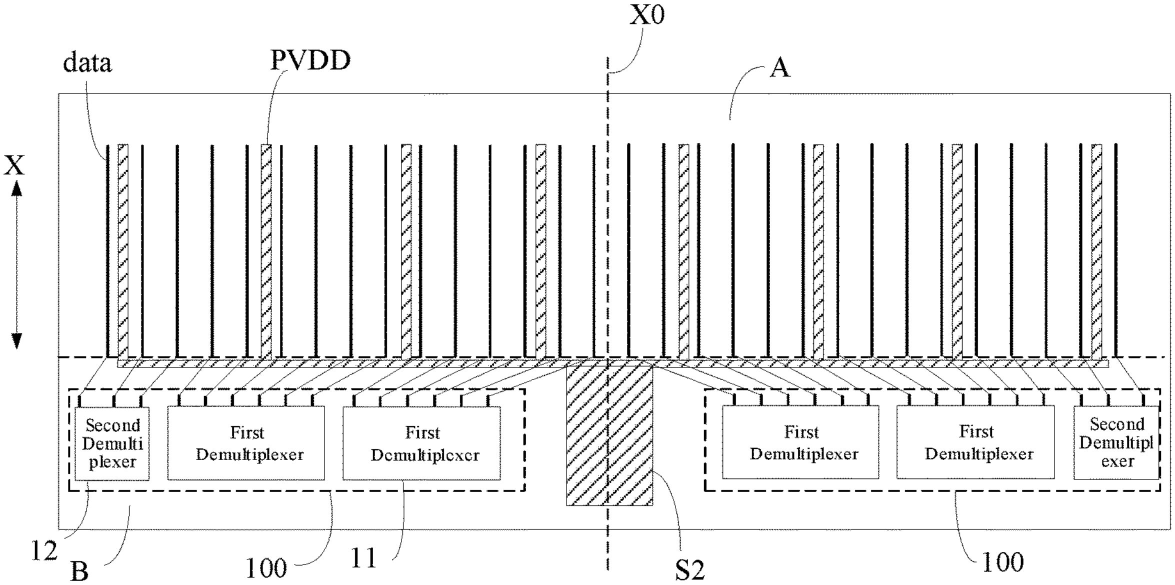
FIG. 8 illustrates a schematic diagram of another exemplary display panel consistent with disclosed embodiments of the present disclosure.

FIG. 8 illustrates a schematic diagram of another display panel consistent with disclosed embodiments of the present disclosure. In the disclosed display panel, in one embodiment, referring to FIG. 8, the signal line may include a fixed power voltage line PVDD. The driving chip may apply a signal to each power voltage line PVDD through the first wiring S1. In one embodiment, because the entire power voltage lines PVDD in the display region may have a same signal, the entire power voltage lines PVDD may be connected to one first wiring S2, such that the signal may be transmitted to the entire power voltage lines PVDD through one first wiring S2. In another embodiment, the entire power voltage lines PVDD may be connected to a plurality of first wirings S2, such that signals may be simultaneously transmitted to entire power voltage lines PVDD through the plurality of first wirings S2. However, a substantially large quantity of first wirings S2 may not facilitate the narrow-border design, and, thus, the fewer the quantity of first wirings S2, the smaller the border width.

Figure 9:
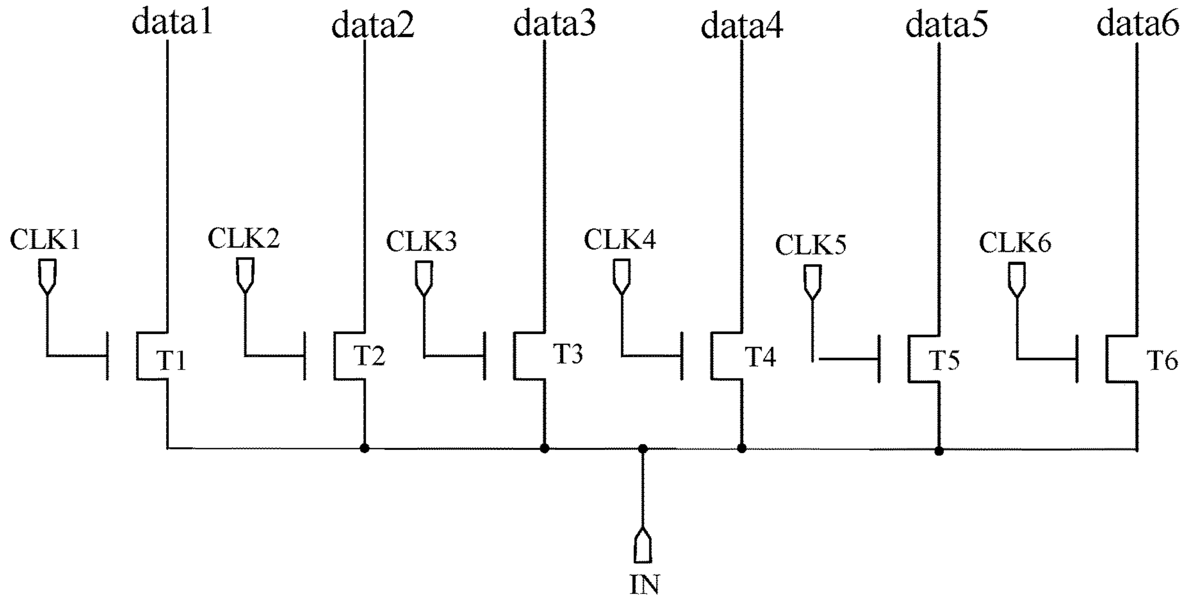
FIG. 9 illustrates a schematic diagram of an exemplary demultiplexer consistent with disclosed embodiments of the present disclosure.

FIG. 9 illustrates a schematic diagram of a demultiplexer consistent with disclosed embodiments of the present disclosure. In one embodiment, referring to FIG. 9, the demultiplexer may often include a plurality of transistors: T1, T2, T3, T4, T5, and T6. A transistor may often include a gate, a first electrode, and a second electrode. For illustrative purposes, FIG. 9 illustrates six transistors, and ach transistor may be connected to one clock signal line and one data line.

In one embodiment, a gate of the transistor T1 may be connected to a clock signal line CLKI, and a first electrode of the transistor T1 may be connected to a data line 'data1'. A gate of the transistor T2 may be connected to a clock signal line CLK2, and a first electrode of the transistor T2 may be connected to a data line 'data2'. A gate of the transistor T3 may be connected to a clock signal line CLK3, and a first electrode of the transistor T3 may be connected to a data line data3'. A gate of the transistor T4 may be connected to a clock signal line CLK4, and a first electrode of the transistor T4 may be connected to a data line 'data4'. A gate of the transistor T5 may be connected to a clock signal line CLK5, and a first electrode of the transistor T5 may be connected to a data line data5'. A gate of the transistor T6 may be connected to a clock signal line CLK6, and a first electrode of the transistor T6 may be connected to a data line 'data6'. The second electrodes of the six transistors may be connected to a same input terminal IN.

The input terminal IN may often be electrically connected to a data signal bus. The demultiplexer may receive a grayscale signal generated by the driving chip according to the image data through the input terminal IN. Merely one transistor in the demultiplexer may be turned on at a same time. For example, when the clock signal line CLK1 controls the transistor T1 to be turned on, the other transistors T2-T6 may be turned off, and the demultiplexer may provide the signal outputted from the driving chip to the data line 'data1'.

In one embodiment, the driving chip may be bound to the border region of the display panel through a printed circuit board. In another embodiment, the driving chip may be directly bound to the border region of the display panel, which is not limited herein.

Figure 10:
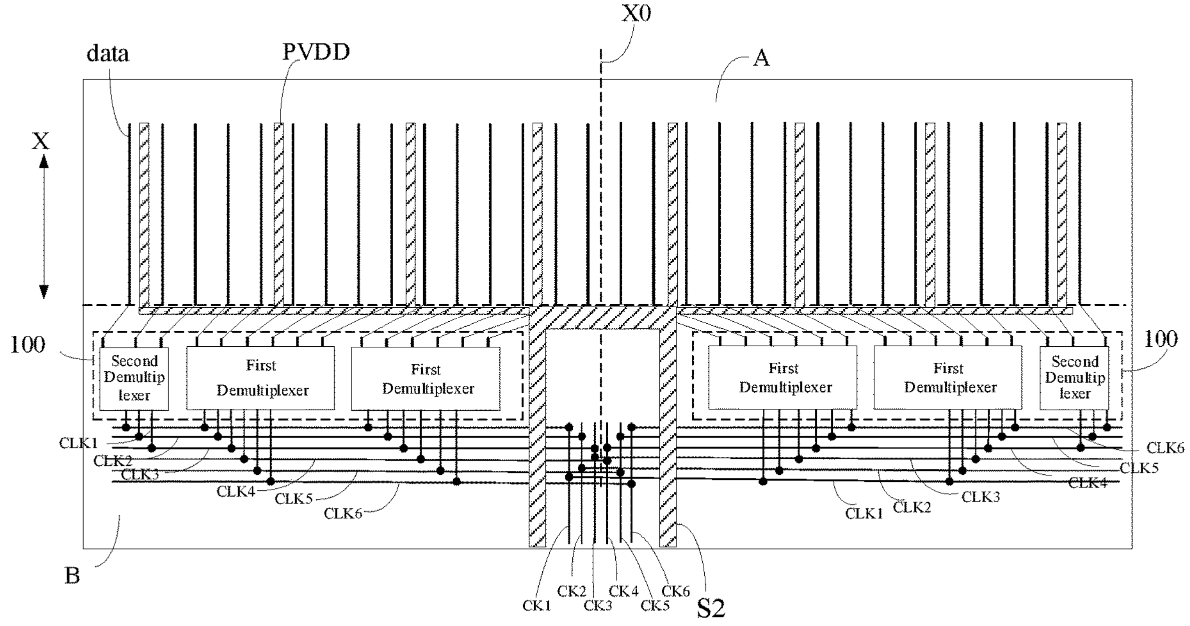
FIG. 10 illustrates a schematic diagram of another exemplary display panel consistent with disclosed embodiments of the present disclosure.

FIG. 10 illustrates a schematic diagram of another display panel consistent with disclosed embodiments of the present disclosure. In the disclosed display panel, in one embodiment, referring to FIG. 10, the border region B may further include a plurality of clock signal lines CLK1-CLK6 arranged in the first direction X and electrically connected to corresponding first-demultiplexers 11 or second-demultiplexers 12. A plurality of clock signal buses CK1-CK6 extending along the first direction may be disposed in the gap.

After being extended to the gap, the clock signal lines CLK1-CLK6 having the same signal and electrically connected to the corresponding different first-demultiplexer 11 or second-demultiplexer 12 may be electrically connected to the corresponding clock signal buses CK1-CK6. In other words, the two circuit groups 100 may share a set of clock signal buses CK1-CK6, which may reduce the quantity of clock signal buses in the border region, thereby facilitating the narrow-border design.

In the disclosed display panel, in one embodiment, referring to FIG. 10, to ensure the clock signal lines CLK1-CLK6 connected to corresponding two circuit groups 100 to be capable of being symmetrically distributed, thereby ensuring the clock signal lines CLK1-CLK6 to have a same load, the clock signal buses CK1-CK6 may be disposed near the first symmetry axis X0. For example, referring to FIG. 10, three clock signal buses CK1-CK3 may be disposed on a left side of the first symmetry axis X0, and three clock signal buses CK4-CK6 may be disposed on a right side of the first symmetry axis X0. In view of this, a quantity of first wirings S2 connected to the fixed power voltage line PVDD may be two, and the two first wirings S2 may be disposed on both sides of the clock signal buses CK1-CK6. Therefore, the connections between the fixed power voltage lines PVDD and the first wirings S2 on the left and right sides of the display panel may be ensured to be symmetrically distributed.

Figure 11:
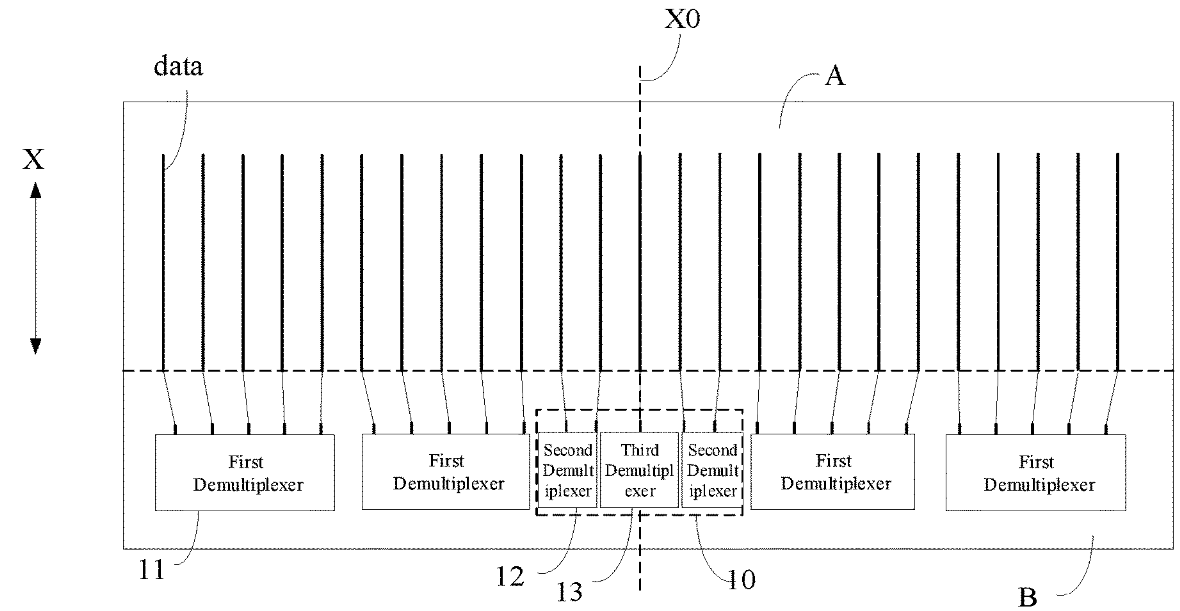
FIG. 11 illustrates a schematic diagram of another exemplary display panel consistent with disclosed embodiments of the present disclosure.
Figure 12:
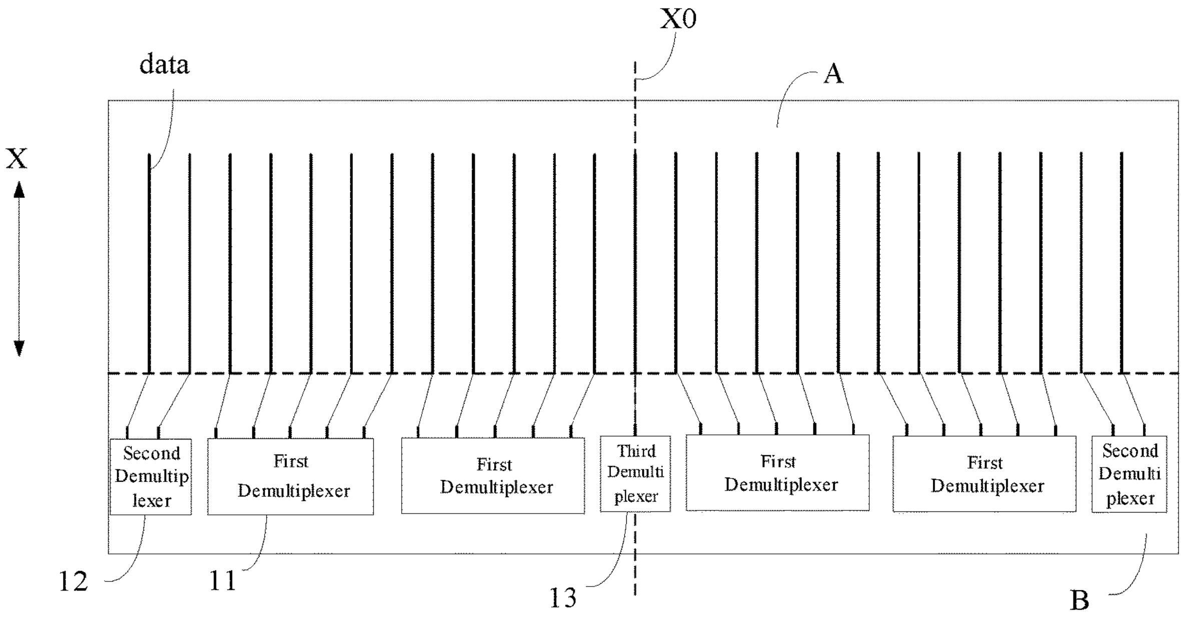
FIG. 12 illustrates a schematic diagram of another exemplary display panel consistent with disclosed embodiments of the present disclosure.

FIG. 11 illustrates a schematic diagram of another display panel consistent with disclosed embodiments of the present disclosure; and FIG. 12 illustrates a schematic diagram of another display panel consistent with disclosed embodiments of the present disclosure. In the disclosed display panel, in one embodiment, referring to FIG. 11 and FIG. 12, M may be an odd number. In one embodiment, each demultiplexer group 10 may be connected to an odd number of data lines. The demultiplexer group 10 may include two second-demultiplexers 12 and one third-demultiplexer 13. The third-demultiplexer 13 may be electrically connected to Q data lines, where P>Q≥1, and Q is a positive integer. In view of this, the two second-demultiplexers 12 may be symmetrically distributed with respect to the first symmetry axis X0, such that the data lines 'data' connected to the second-demultiplexers 12 may be symmetrically distributed in the border region B. The third-demultiplexer 13 may be symmetrically distributed with respect to the first symmetry axis X0, such that the data lines 'data' connected to the third-demultiplexer 13 may be ensured to be symmetrically distributed in the border region B.

In the disclosed display panel, in one embodiment, referring to FIG. 11 and FIG. 12, P may be an even number, and Q may be an odd number. The third-demultiplexer 13 may be disposed between two second-demultiplexers.

In the disclosed display panel, in one embodiment, referring to FIG. 11, L first-demultiplexers 11 may be disposed on each side of the demultiplexer group 10. In other words, the two second-demultiplexers 12 may be symmetrically distributed with respect to the first symmetry axis X0, the 2L first-demultiplexers 11 may be symmetrically distributed with respect to the first symmetry axis X0, and the third-demultiplexer 13 may be symmetrically distributed with respect to the first symmetry axis X0. Therefore, the overall data lines 'data' connected to the first, second, and third-demultiplexers in the border region B may be symmetrically distributed with respect to the first symmetry axis X0.

In the disclosed display panel, in one embodiment, referring to FIG. 12, the 2L first-demultiplexers 11 may be sequentially disposed between the two second-demultiplexers 12, and L first-demultiplexers 11 may be disposed on each side of the third-demultiplexer 13. In other words, in the demultiplexer group 10, the third-demultiplexer 13 may be symmetrically distributed with respect to the first symmetry axis X0, and the data lines 'data' connected to the second-demultiplexers 12 may be located near the left border region and the right border region of the display panel in FIG. 12. In view of this, when the second-demultiplexer 12 and the first-demultiplexer 11 have different display effect due to different structures thereof, because the data lines 'data' connected to the second-demultiplexers 12 are close to the border region, the display difference near the border region of the display panel may not be easily recognized by eyes, such that the display effect may be ensured.

Figure 13:
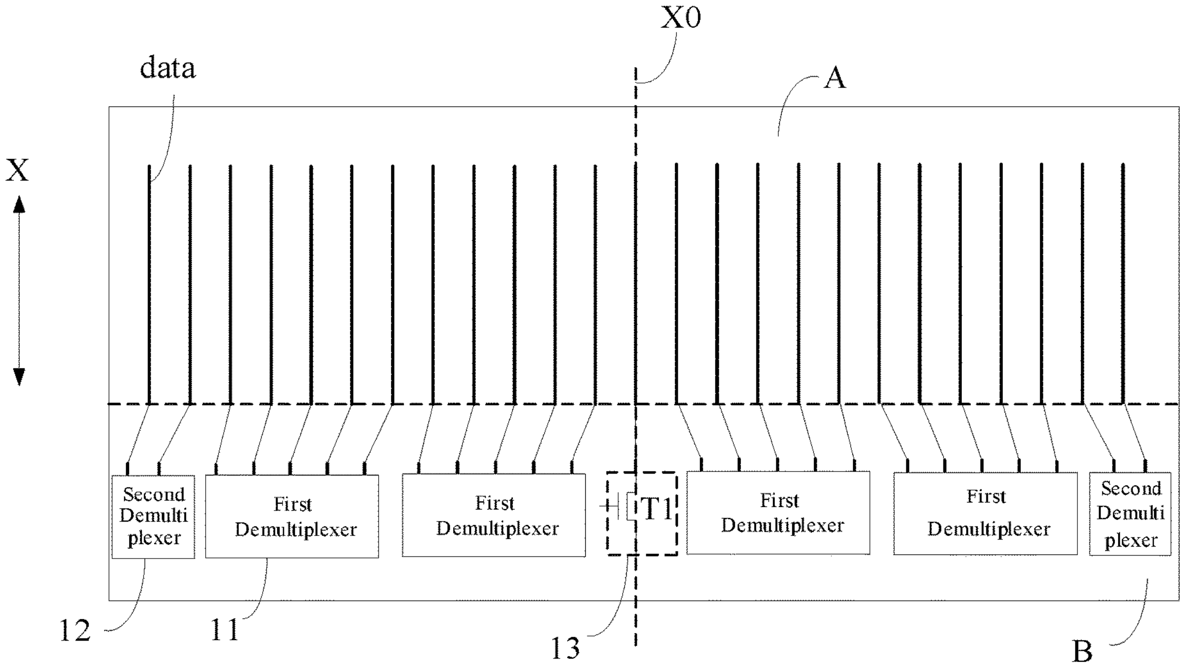
FIG. 13 illustrates a schematic diagram of another exemplary display panel consistent with disclosed embodiments of the present disclosure.
Figure 14:
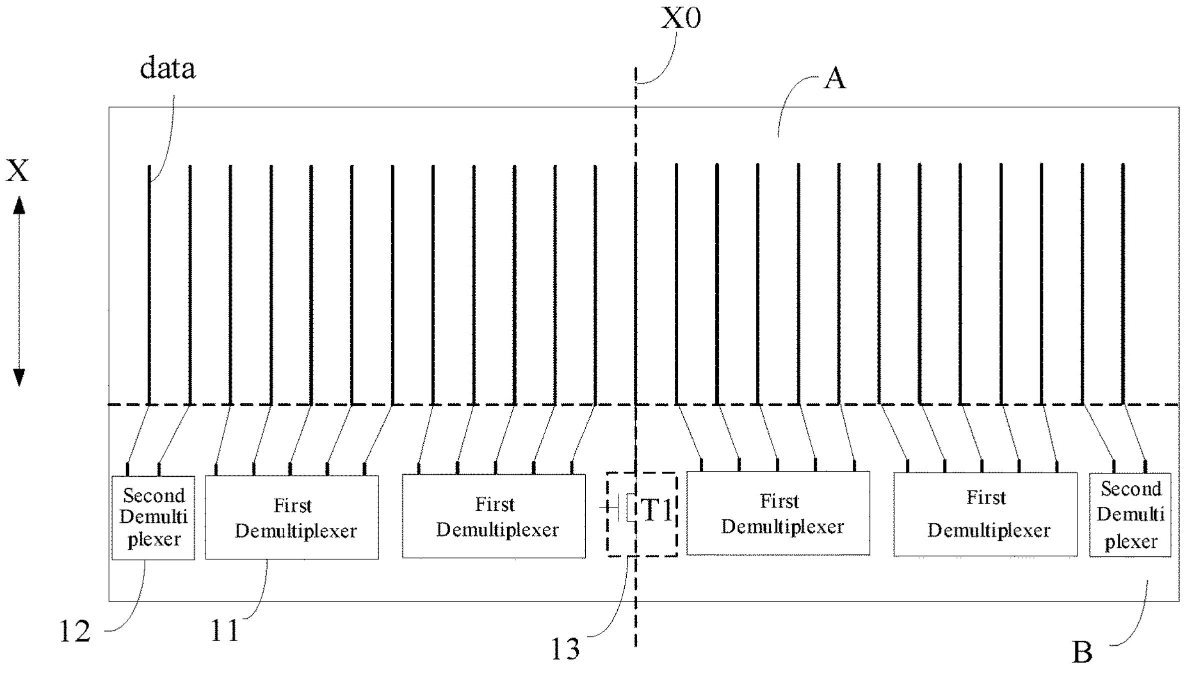
FIG. 14 illustrates a schematic diagram of another exemplary display panel consistent with disclosed embodiments of the present disclosure.

FIG. 13 illustrates a schematic diagram of another display panel consistent with disclosed embodiments of the present disclosure, and FIG. 14 illustrates a schematic diagram of another display panel consistent with disclosed embodiments of the present disclosure. In the disclosed display panel, in one embodiment, when Q=1, referring to FIG. 13, the third-demultiplexer 13 may include one transistor T1, and the data line 'data' may be connected to a data signal bus (not illustrated in FIG. 13) through the transistor T1. In another embodiment, referring to FIG. 14, the third-demultiplexer 13 may include one wiring S0, and the data line 'data' may be directly connected to the data signal bus (not illustrated in FIG. 14) through the wiring S0. In other words, the third-demultiplexer 13 may be a pseudo demultiplexer.

Figure 15:
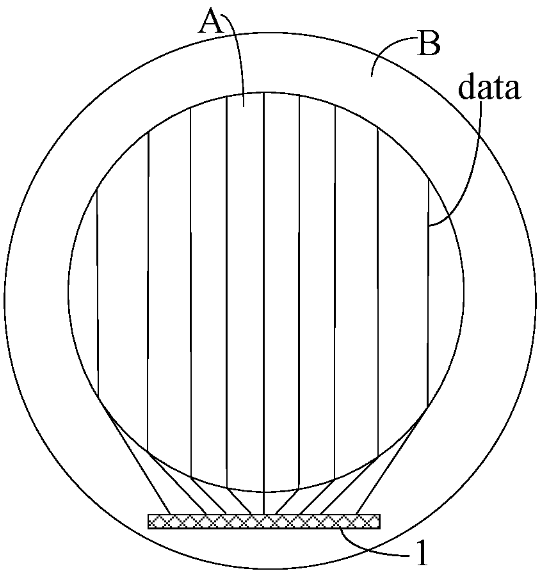
FIG. 15 illustrates a schematic diagram of another exemplary display panel consistent with disclosed embodiments of the present disclosure.

In the disclosed display panel, in one embodiment, the shape of the display region may be any symmetrical shape that is symmetrical with respect to the first symmetry axis, which is not limited herein. FIG. 15 illustrates a schematic diagram of another display panel consistent with disclosed embodiments of the present disclosure. Referring to FIG. 15, the display region A may have a round shape. In view of this, the display panel may be a smart watch, etc. In another embodiment, the display region A may have a rectangular shape, etc. The display region A may include data lines 'data', and the border region B may be disposed with a data output circuit 1.

Figure 16:
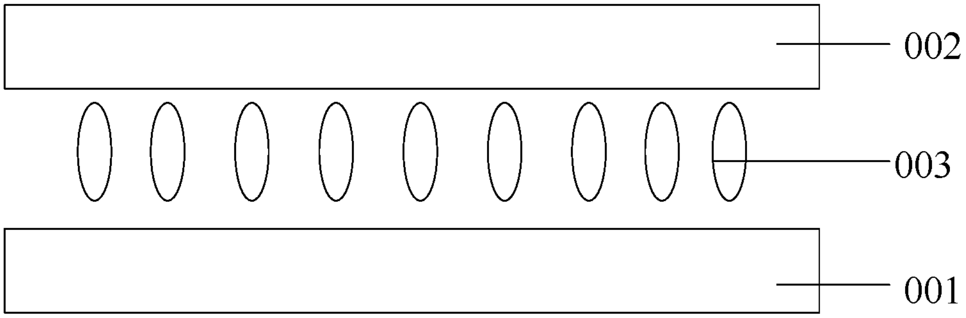
FIG. 16 illustrates a schematic diagram of another exemplary display panel consistent with disclosed embodiments of the present disclosure.
Figure 17:
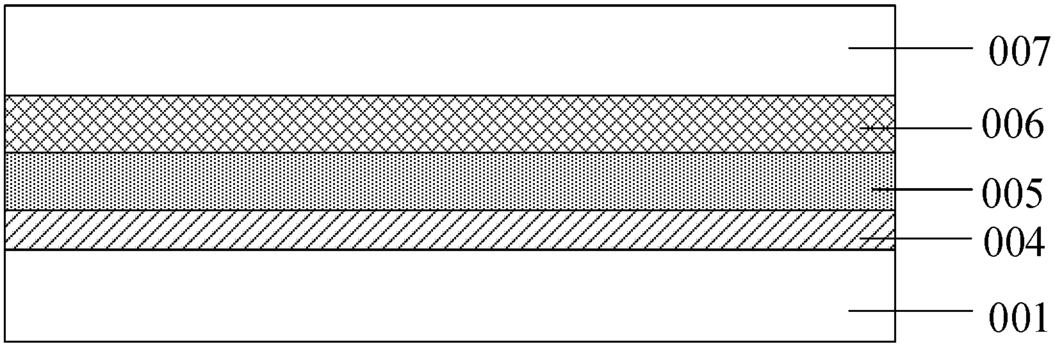
FIG. 17 illustrates a schematic diagram of another exemplary display panel consistent with disclosed embodiments of the present disclosure.

FIG. 16 illustrates a schematic diagram of another display panel consistent with disclosed embodiments of the present disclosure. In one embodiment, the disclosed display panel may be a liquid crystal display panel as illustrated in FIG. 16. FIG. 17 illustrates a schematic diagram of another display panel consistent with disclosed embodiments of the present disclosure. In another embodiment, the disclosed display panel may be an organic light-emitting diode (OLED) display panel as illustrated in FIG. 17. In certain embodiments, the disclosed display panel may be an electronic paper, which is not limited herein.

In one embodiment, when the display panel is a liquid crystal display panel, referring to FIG. 16, the display panel may include an array substrate 001 and a color filter substrate 002 that are disposed opposite to each other, and a liquid crystal layer 003 disposed between the array substrate 001 and the color filter substrate 002.

In one embodiment, when the display panel is an OLED display panel, referring to FIG. 17, the display panel may include an anode layer 004, a light-emitting layer 005, a cathode layer 006, and an encapsulation layer 007 that are sequentially disposed over the array substrate 001.

Figure 18:
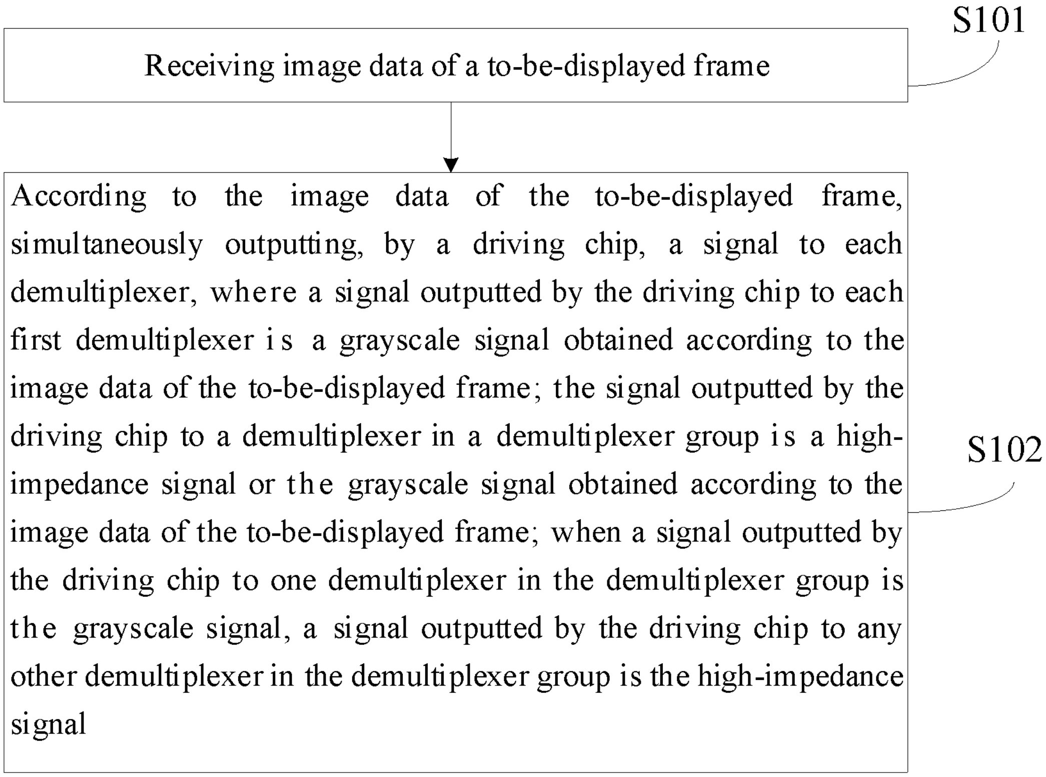
FIG. 18 illustrates a flow chart of an exemplary driving method of a display panel consistent with disclosed embodiments of the present disclosure.

The present disclosure also provides a driving method of a display panel in any of disclosed embodiments. FIG. 18 illustrates a flow chart of a driving method of a display panel consistent with disclosed embodiments of the present disclosure. Referring to FIG. 18, the driving method may include:

S101: Receiving image data of a to-be-displayed frame; and

S102: According to the image data of the to-be-displayed frame, simultaneously outputting, by a driving chip, a signal to each demultiplexer.

The signal outputted by the driving chip to each first-demultiplexer may be a grayscale signal obtained according to the image data of the to-be-displayed frame. The signal outputted by the driving chip to a demultiplexer in the demultiplexer group may be a high-impedance signal or a grayscale signal obtained according to the image data of the to-be-displayed frame. When a signal outputted by the driving chip to one demultiplexer in the demultiplexer group is a grayscale signal, the signal outputted by the driving chip to any other demultiplexer in the demultiplexer group may be a high-impedance signal.

Figure 19:
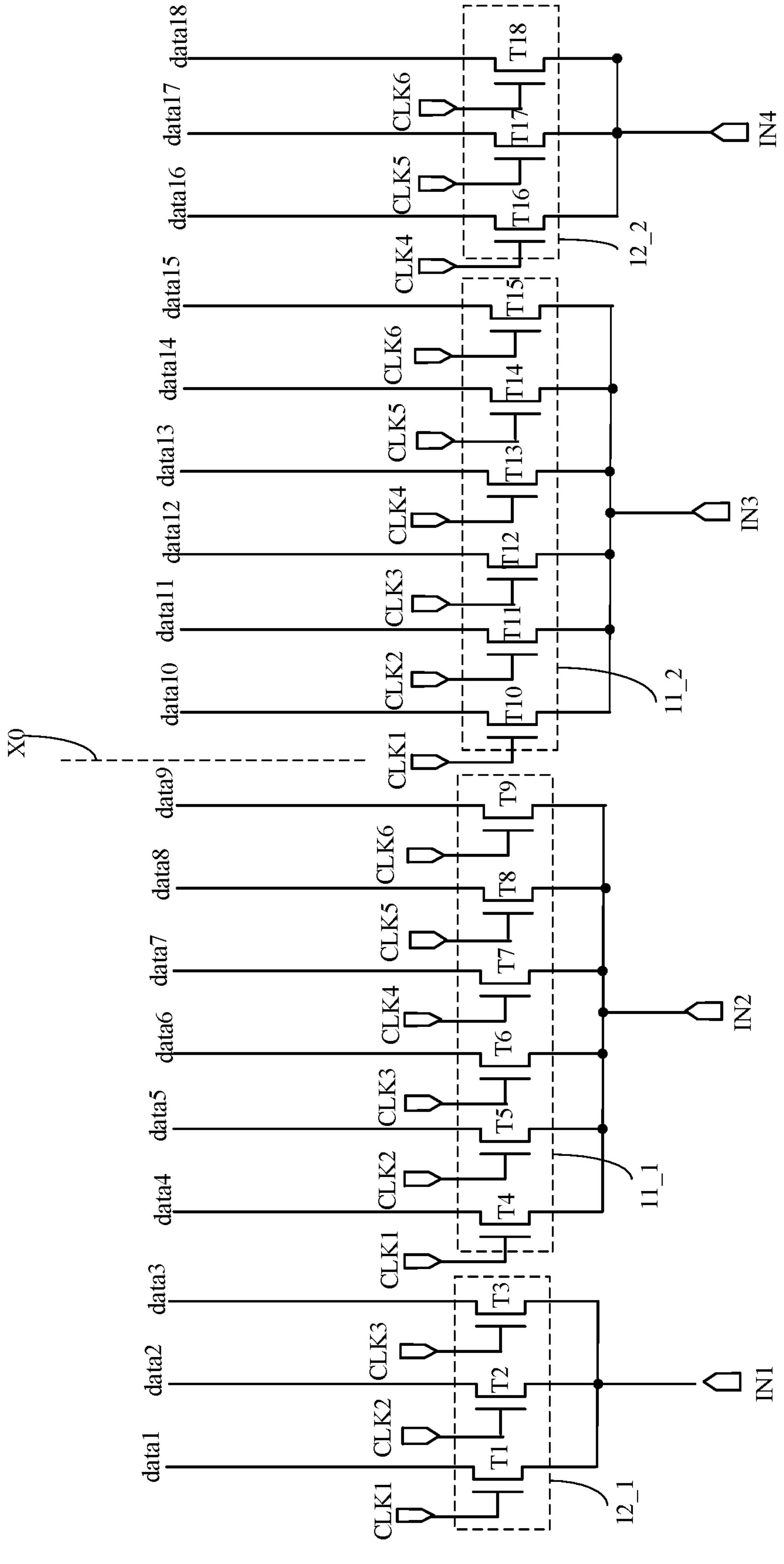
FIG. 19 illustrates a schematic diagram of another exemplary display panel consistent with disclosed embodiments of the present disclosure.
Figure 20:
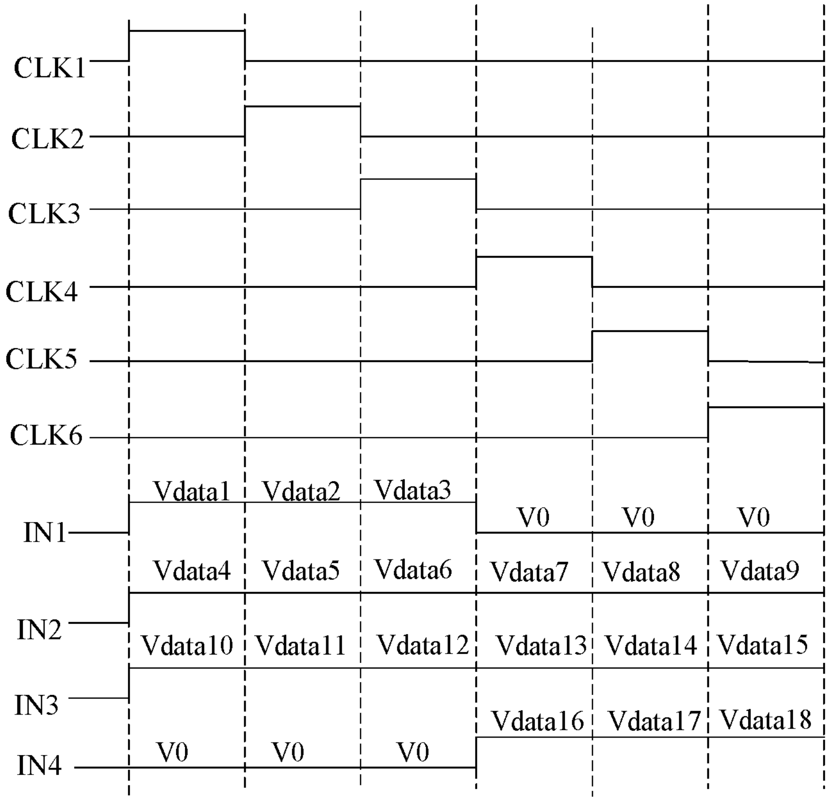
FIG. 20 illustrates a timing sequence diagram corresponding to a display panel in FIG. 19 consistent with disclosed embodiments of the present disclosure.

FIG. 19 illustrates a schematic diagram of another display panel consistent with disclosed embodiments of the present disclosure; and FIG. 20 illustrates a timing sequence diagram corresponding to the display panel in FIG. 19. In one embodiment, for illustrative purposes, the driving method may be described with reference to the display panel illustrated in FIG. 19 and the timing sequence diagram illustrated in FIG. 20.

Referring to FIG. 19, the second-demultiplexer 12_1 may include transistors T1, T2, and T3, which may be connected to the data lines 'data1', 'data2', and 'data3', respectively. The transistors T1, T2, and T3 may be connected to an input terminal IN1. The second-demultiplexer 12_2 may include transistors T16, T17, and T18, which may be connected to data lines 'data16', 'data17', and 'data18', respectively. The transistors T16, T17, and T18 may be connected to an input terminal IN4. The first-demultiplexer 11_1 may include transistors T4, T5, T6, T7, T8, and T9, which may be connected to data lines 'data4', 'data5', 'data6', 'data7', 'data8', and 'data9', respectively. The transistors T4, T5, T6, T7, T8, and T9 may be connected to an input terminals IN2. The first-demultiplexer 11_2 may include transistors T10, T11, T12, T13, T14, and T15, which may be connected to data lines 'data10', 'data11', 'data12', 'data13', 'data14', and 'data15', respectively. The transistors T10, T11, T12, T13, T14, and T15 may be connected to an input terminal IN3.

Referring to FIG. 20, when the clock signal line CLK1 outputs a high-potential-level signal: the transistor T1 in the second-demultiplexer 12_1 may be turned on, the driving chip may provide a grayscale signal Vdata1 to the second-demultiplexer 12_1 through the input terminal IN1, and the second-demultiplexer 12_1 may provide the grayscale signal Vdata1 to the data line 'data1' through the transistor T1. The transistor T4 in the first-demultiplexer 11_1 may be turned on, the driving chip may provide a grayscale signal Vdata4 to the first-demultiplexer 11_1 through the input terminal IN2, and the first-demultiplexer 11_1 may provide the grayscale signal Vdata4 to the data line 'data4' through the transistor T4. The transistor T10 in the first-demultiplexer 11_2 may be turned on, the driving chip may provide a grayscale signal Vdata10 to the first-demultiplexer 11_2 through the input terminal IN3, and the first-demultiplexer 11_2 may provide the grayscale signal Vdata10 to the data line 'data10' through the transistor T10. The entire transistors in the second-demultiplexer 12_2 may be turned off, and the driving chip may provide a high-impedance signal V0 to the second-demultiplexer 12_2 through the input terminal IN4.

When the clock signal line CLK2 outputs a high-potential-level signal: the transistor T2 in the second-demultiplexer 12_1 may be turned on, the driving chip may provide a grayscale signal Vdata2 to the second-demultiplexer 12_1 through the input terminal IN1, and the second-demultiplexer 12_1 may provide the grayscale signal Vdata2 to the data line 'data2' through the transistor T2. The transistor T5 in the first-demultiplexer 11_1 may be turned on, the driving chip may provide a grayscale signal Vdata5 to the first-demultiplexer 11_1 through the input terminal IN2, and the first-demultiplexer 11_1 may provide the grayscale signal Vdata5 to the data line 'data5' through the transistor T5. The transistor T11 in the first-demultiplexer 11_2 may be turned on, the driving chip may provide a grayscale signal Vdata11 to the first-demultiplexer 11_2 through the input terminal IN3, and the first-demultiplexer 11_2 may provide the grayscale signal Vdata11 to the data line 'data11' through the transistor T11. The entire transistors in the second-demultiplexer 12_2 may be turned off, and the driving chip may provide a high-impedance signal V0 to the second-demultiplexer 12_2 through the input terminal IN4.

When the clock signal line CLK3 outputs a high-potential-level signal: the transistor T3 in the second-demultiplexer 12_1 may be turned on, the driving chip may provide a grayscale signal Vdata3 to the second-demultiplexer 12_1 through the input terminal IN1, and the second-demultiplexer 12_1 may supply a grayscale signal Vdata3 to the data line 'data3' through the transistor T3. The transistor T6 in the first-demultiplexer 11_1 may be turned on, the driving chip may provide a grayscale signal Vdata6 to the first-demultiplexer 11_1 through the input terminal IN2, and the first-demultiplexer 11_1 may provide the grayscale signal Vdata6 to the data line 'data6' through the transistor T6. The transistor T12 in the first-demultiplexer 11_2 may be turned on, the driving chip may provide a grayscale signal Vdata12 to the first-demultiplexer 11_2 through the input terminal IN3, and the first-demultiplexer 11_2 may provide the grayscale signal Vdata12 to the data line 'data12' through the transistor T12. The entire transistors in the second-demultiplexer 12_2 may be turned off, and the driving chip may provide the high-impedance signal V0 to the second-demultiplexer 12_2 through the input terminal IN4.

When the clock signal line CLK4 outputs a high-potential-level signal: the entire transistors in the second-demultiplexer 12_1 may be turned off, and the driving chip may provide the high-impedance signal V0 to the second-demultiplexer 12_1 through the input terminal IN1. The transistor T7 in the first-demultiplexer 11_1 may be turned on, the driving chip may provide a grayscale signal Vdata7 to the first-demultiplexer 11_1 through the input terminal IN2, and the first-demultiplexer 11_1 may provide the grayscale signal Vdata7 to the data line 'data7' through the transistor T7. The transistor T13 in the first-demultiplexer 11_2 may be turned on, the driving chip may provide a grayscale signal Vdata13 to the first-demultiplexer 11_2 through the input terminal IN3, and the first-demultiplexer 11_2 may provide the grayscale signal Vdata13 to the data line 'data13' through the transistor T13. The transistor T16 in the second-demultiplexer 12_2 may be turned on, and the driving chip may provide a grayscale signal Vdata16 to the second-demultiplexer 12_2 through the input terminal IN4, and the second-demultiplexer 12_2 may provide the grayscale signal Vdata16 to the data line 'data16' through the transistor T16.

When the clock signal line CLK5 outputs a high-potential-level signal: the entire transistors in the second-demultiplexer 12_1 may be turned off, and the driving chip may provide the high-impedance signal V0 to the second-demultiplexer 12_1 through the input terminal IN1. The transistor T8 in the first-demultiplexer 11_1 may be turned on, the driving chip may provide a grayscale signal Vdata8 to the first-demultiplexer 11_1 through the input terminal IN2, and the first-demultiplexer 11_1 may provide the grayscale signal Vdata8 to the data line 'data8' through the transistor T8. The transistor T14 in the first-demultiplexer 11_2 may be turned on, the driving chip may provide a grayscale signal Vdata14 to the first-demultiplexer 11_2 through the input terminal IN3, and the first-demultiplexer 11_2 may provide the grayscale signal Vdata14 to the data line 'data14' through the transistor T14. The transistor T17 in the second-demultiplexer 12_2 may be turned on, the driving chip may provide the grayscale signal Vdata17 to the second-demultiplexer 12_2 through the input terminal IN4, and the second-demultiplexer 12_2 may provide the grayscale signal Vdata17 to the data line 'data17' through the transistor T17.

When the clock signal line CLK6 outputs a high-potential-level signal: the entire transistors in the second-demultiplexer 12_1 may be turned off, and the driving chip may provide the high-impedance signal V0 to the second-demultiplexer 12_1 through the input terminal IN1. The transistor T9 in the first-demultiplexer 11_1 may be turned on, the driving chip may provide a grayscale signal Vdata9 to the first-demultiplexer 11_1 through the input terminal IN2, and the first-demultiplexer 11_1 may provide the grayscale signal Vdata9 to the data line 'data9' through the transistor T9. The transistor T15 in the first-demultiplexer 11_2 may be turned on, the driving chip may provide a grayscale signal Vdata15 to the first-demultiplexer 11_2 through the input terminal IN3, and the first-demultiplexer 11_2 may provide the grayscale signal Vdata15 to the data line 'data15' through the transistor T15. The transistor T18 in the second-demultiplexer 12_2 may be turned on, the driving chip may provide a grayscale signal Vdata18 to the second-demultiplexer 12_2 through the input terminal IN4, and the second-demultiplexer 12_2 may provide the grayscale signal Vdata18 to the data line 'data18' through the transistor T18.

Figure 21:
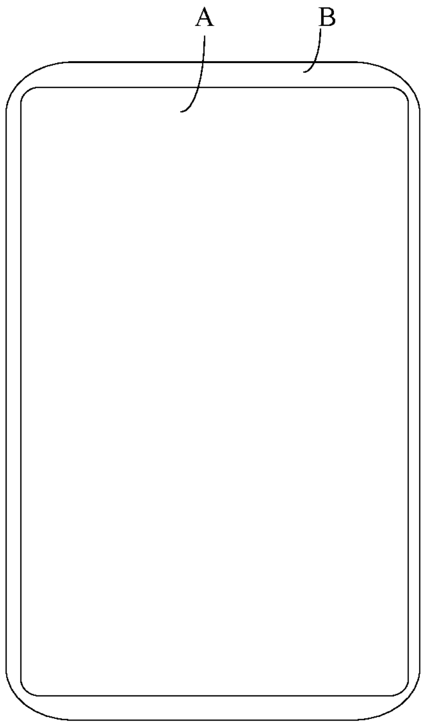
FIG. 21 illustrates a schematic diagram of an exemplary display device consistent with disclosed embodiments of the present disclosure.

The present disclosure also provides a display device including a display panel in any of disclosed embodiments. The display device may be any product or component having a display function, e.g., a smart watch, a mobile phone as illustrated in FIG. 21, a tablet computer, a television, a display, a notebook computer, a digital photo frame, a navigator, etc. The implementation of the display device may refer to related above-described embodiments of the display panel, which is not repeated herein.

In the disclosed display panel and driving method, and the display device, because the data output circuit includes at least one demultiplexer group and an even number of first-demultiplexers, the even number of first-demultiplexers may ensure the data lines connected to the first-demultiplexers to be symmetrically distributed in the border region. Because the quantity of data lines connected to one demultiplexer group is the same as the quantity of data lines connected to one first-demultiplexer, and each demultiplexer group includes a plurality of second-demultiplexers, the quantity of data lines connected to each second-demultiplexer may be at most half of the quantity of data lines connected to one first-demultiplexer. Therefore, it may be ensured that the data lines connected to the second-demultiplexers may be symmetrically distributed in the border region, or the distribution asymmetry of the data lines connected to the second-demultiplexers in the border region may be reduced. In other words, the abnormal display caused by the asymmetry distribution of the data lines in the border region may be solved or improved.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments illustrated herein but is to be accorded the widest scope consistent with the principles and novel features disclosed herein.

What is claimed is:

1. A display panel, comprising:

a display region and a border region, wherein:

the display region includes a plurality of pixels and a plurality of data lines extending along a first direction, the display region has a first symmetry axis, wherein the first symmetry axis is extended along the first direction, the border region includes a data output circuit, and an output end of the data output circuit is electrically connected to a data line of the plurality of data lines, the data output circuit includes at least one demultiplexer group and 2L first-demultiplexers disposed on two opposite sides of the first symmetry axis, wherein L is a positive integer, and L≥1, one demultiplexer group of the at least one demultiplexer group is electrically connected to M data lines and includes at least two second-demultiplexers disposed on two opposite sides of the first symmetry axis, and one first-demultiplexer of the 2L first-demultiplexers is electrically connected to N data lines, wherein M=N≥2, and M and N are positive integers, respectively, and the number of data lines connected to a single second-demultiplexer is at most half of the number of data lines connected to a single first-demultiplexer of the 2L first-demultiplexers, each demultiplexer group of the at least one demultiplexer group includes a plurality of second-demultiplexers, and each second-demultiplexer of the plurality of second-demultiplexers is electrically connected to P data lines, wherein N>P≥1, and P is a positive integer;

the plurality of second-demultiplexers share a group of clock signal buses, wherein a portion of the plurality of second-demultiplexers are connected with a portion of the group of clock signal buses, and a remaining portion of the plurality of second-demultiplexers are connected with a remaining portion of the group of clock signal buses.

2. The display panel according to claim 1, wherein:

all of the 2L first-demultiplexers and the plurality of second-demultiplexers together are symmetrically distributed using the first symmetry axis as a symmetry axis.

3. The display panel according to claim 1, wherein:

M is an even number, wherein:

the display panel includes one demultiplexer group, and the one demultiplexer group includes two second-demultiplexers.

4. The display panel according to claim 1, wherein:

M is an odd number, wherein:

a demultiplexer group of the at least one demultiplexer group includes two second-demultiplexers and one third-demultiplexer, wherein the one third-demultiplexer is electrically connected to Q data lines, wherein P>Q≥1, and Q is a positive integer.

5. The display panel according to claim 4, wherein:

P is an even number, and Q is an odd number, wherein the one third-demultiplexer is disposed between the two second-demultiplexers.

6. The display panel according to claim 3, wherein:

the 2L first-demultiplexers are sequentially disposed adjacent to each other and between the two second-demultiplexers.

7. The display panel according to claim 3, wherein:

the two second-demultiplexers are disposed adjacent to each other, and L first-demultiplexers of the 2L first-demultiplexers are disposed on each side of the one demultiplexer group.

8. The display panel according to claim 3, wherein:

the plurality of second-demultiplexers are electrically connected with C data lines, and C is a positive integer; and the plurality of second-demultiplexers located on a side of the first symmetry axis are sequentially connected with a first half of the C data lines, and the plurality of second-demultiplexers located on a remaining side of the first symmetry axis are sequentially connected with a remaining half of the C data lines.

9. The display panel according to claim 4, wherein:

the 2L first-demultiplexers are sequentially disposed between the two second-demultiplexers, and L first-demultiplexers of the 2L first-demultiplexers are disposed on each side of the one third-demultiplexer.

10. The display panel according to claim 4, wherein:

L first-demultiplexers of the 2L first-demultiplexers are disposed on each side of the demultiplexer group.

11. The display panel according to claim 6, wherein:

L first-demultiplexers of the 2L first-demultiplexers and one second-demultiplexer that are sequentially disposed adjacent to each other form a circuit group, and the border region includes two circuit groups, wherein:

a gap is between the two circuit groups, the display region further includes a plurality of signal lines, and a first wiring extending along the first direction is disposed in the gap, and the first wiring is electrically connected to a signal line of the plurality of signal lines.

12. The display panel according to claim 10, wherein:

the signal line includes a fixed power voltage line.

13. The display panel according to claim 10, wherein:

the border region further includes a plurality of clock signal lines arranged along the first direction and electrically connected to the 2L first-demultiplexers and the two second-demultiplexers, correspondingly, a plurality of clock signal buses extending along the first direction are disposed in the gap, and after being extended to the gap, clock signal lines of the plurality of clock signal lines having a same signal and electrically connected to corresponding different first-demultiplexers or second-demultiplexers are electrically connected to a corresponding clock signal bus of the plurality of clock signal buses.

14. The display panel according to claim 1, wherein:

the display region has a round shape.

15. A display device, comprising a display panel, wherein the display panel includes:

a display region and a border region, wherein:

the display region includes a plurality of pixels and a plurality of data lines extending along a first direction, the display region has a first symmetry axis, wherein the first symmetry axis is extended along the first direction, the border region includes a data output circuit, and an output end of the data output circuit is electrically connected to a data line of the plurality of data lines, the data output circuit includes at least one demultiplexer group and 2L first-demultiplexers disposed on two opposite sides of the first symmetry axis, wherein L is a positive integer, and L≥1, one demultiplexer group of the at least one demultiplexer group is electrically connected to M data lines and includes at least two second-demultiplexers disposed on two opposite sides of the first symmetry axis, and one first-demultiplexer of the 2L first-demultiplexers is electrically connected to N data lines, wherein M=N≥2, and M and N are positive integers, respectively, and the number of data lines connected to a single second-demultiplexer is at most half of the number of data lines connected to a single first-demultiplexer of the 2L first-demultiplexers, each demultiplexer group of the at least one demultiplexer group includes a plurality of second-demultiplexers, and each second-demultiplexer of the plurality of second-demultiplexers is electrically connected to P data lines, wherein N>P≥1, and P is a positive integer, and the plurality of second-demultiplexers share a group of clock signal buses, wherein a portion of the plurality of second-demultiplexers are connected with a portion of the group of clock signal buses, and a remaining portion of the plurality of second-demultiplexers are connected with a remaining portion of the group of clock signal buses.

16. The device according to claim 15, wherein:

all of the 2L first-demultiplexers and the plurality of second-demultiplexers together are symmetrically distributed using the first symmetry axis as a symmetry axis.

17. The device according to claim 15, wherein:

M is an even number, wherein:

the display panel includes one demultiplexer group, and the one demultiplexer group includes two second-demultiplexers.

18. The device according to claim 17, wherein:

the 2L first-demultiplexers are sequentially disposed adjacent to each other and between the two second-demultiplexers.

19. The device according to claim 17, wherein:

the two second-demultiplexers are disposed adjacent to each other, and L first-demultiplexers of the 2L first-demultiplexers are disposed on each side of the one demultiplexer group.

20. The device according to claim 17, wherein:

L first-demultiplexers of the 2L first-demultiplexers and one second-demultiplexer that are sequentially disposed adjacent to each other form a circuit group, and the border region includes two circuit groups, wherein:

a gap is between the two circuit groups, the display region further includes a plurality of signal lines, and a first wiring extending along the first direction is disposed in the gap, and the first wiring is electrically connected to a signal line of the plurality of signal lines.

21. The device according to claim 17, wherein:

the plurality of second-demultiplexers are electrically connected with C data lines, and C is a positive integer; and the plurality of second-demultiplexers located on a side of the first symmetry axis are sequentially connected with a first half of the C data lines, and the plurality of second-demultiplexers located on a remaining side of the first symmetry axis are sequentially connected with a remaining half of the C data lines.

22. A driving method of a display panel, wherein:

the display panel includes:

a display region and a border region, wherein:

the display region includes a plurality of pixels and a plurality of data lines extending along a first direction, the display region has a first symmetry axis, wherein the first symmetry axis is extended along the first direction, the border region includes a data output circuit, and an output end of the data output circuit is electrically connected to a data line of the plurality of data lines, the data output circuit includes at least one demultiplexer group and 2L first-demultiplexers disposed on two opposite sides of the first symmetry axis, wherein L is a positive integer, and L≥1, one demultiplexer group of the at least one demultiplexer group is electrically connected to M data lines and includes at least two second-demultiplexers disposed on two opposite sides of the first symmetry axis, and one first-demultiplexer of the 2L first-demultiplexers is electrically connected to N data lines, wherein M=N≥2, and M and N are positive integers, respectively, and the number of data lines connected to a single second-demultiplexer is at most half of the number of data lines connected to a single first-demultiplexer of the 2L first-demultiplexers, each demultiplexer group of the at least one demultiplexer group includes a plurality of second-demultiplexers, and each second-demultiplexer of the plurality of second-demultiplexers is electrically connected to P data lines, wherein N>P⩾1, and P is a positive integer, and the plurality of second-demultiplexers share a group of clock signal buses, wherein a portion of the plurality of second-demultiplexers are connected with a portion of the group of clock signal buses, and a remaining portion of the plurality of second-demultiplexers are connected with a remaining portion of the group of clock signal buses; and the driving method includes:

receiving image data of a to-be-displayed frame, and according to the image data of the to-be-displayed frame, simultaneously outputting, by a driving chip, a signal to each demultiplexer, wherein:

a signal outputted by the driving chip to each first-demultiplexer of the 2L first-demultiplexers is a grayscale signal obtained according to the image data of the to-be-displayed frame, a signal outputted by the driving chip to a second-demultiplexer of the plurality of second-demultiplexers of a demultiplexer group of the at least one demultiplexer group is one of a high-impedance signal and the grayscale signal obtained according to the image data of the to-be-displayed frame, and when a signal outputted by the driving chip to the second-demultiplexer of the demultiplexer group is the grayscale signal, a signal outputted by the driving chip to any other second-demultiplexer of the demultiplexer group is the high-impedance signal.

* * * * *